US007895656B1

(12) United States Patent
Brock

(10) Patent No.: US 7,895,656 B1
(45) Date of Patent: Feb. 22, 2011

(54) AUTOMATED DETECTION AND CONFIGURATION OF SECURITY DOMAINS

(75) Inventor: Thomas Michael Brock, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 1365 days.

(21) Appl. No.: 11/394,268

(22) Filed: Mar. 29, 2006

(51) Int. Cl.
*G06F 11/00* (2006.01)
*G06F 12/14* (2006.01)
*G06F 12/16* (2006.01)
*G08B 23/00* (2006.01)

(52) U.S. Cl. ............................ 726/24; 726/23; 726/25; 713/188

(58) Field of Classification Search ....................... None
See application file for complete search history.

(56) References Cited

U.S. PATENT DOCUMENTS 7,188,367 B1 * 3/2007 Edwards et al. ............... 726/24
7,310,818 B1 * 12/2007 Parish et al. .................. 726/24
2004/0199827 A1 * 10/2004 Muttik et al. ................. 714/38
2006/0288238 A1 * 12/2006 Ray et al. ................... 713/193

OTHER PUBLICATIONS

"Overview of Exchange Server 2003 and antivirus software," Microsoft Corporation, 2007, [online] [Retrieved on Feb. 6, 2007] Retrieved from the Internet<URL:http://support.microsoft.com/kb/823166>.

"Preventing Symantec AntiVirus 10.0 from scanning the Microsoft Exchange Directory str . . . ," Symantec AntiVirus Corporate Edition 10.0 Symantec Client Security 3.0, Apr. 5, 2005, [online] [Retrieved Feb. 6, 2007] Retrieved from the Internet<URL:http://service1.symantec.com/SUPPORT/ent-security.nsf/pfdocs/2005040513412648?Open...>.

* cited by examiner

*Primary Examiner*—Nasser Moazzami
*Assistant Examiner*—Fatoumata Traore
(74) *Attorney, Agent, or Firm*—Fenwick & West LLP

(57) ABSTRACT

A technique allows for the automatic configuration of anti-malware programs so as to prevent such programs from scanning particular domains. Upon automatic detection of a predetermined type of program, a configuration of that program is determined. Based on the configuration of the predetermined type of program, a domain of the predetermined type of program is excluded from a domain of the anti-malware program. Accordingly, the domain of the anti-malware program is ensured not to overlap with that of the predetermined type of program.

22 Claims, 4 Drawing Sheets

AUTOMATED DETECTION AND CONFIGURATION OF SECURITY DOMAINS

BACKGROUND

As the Internet continues to expand in terms of both connectivity and number of users, the amount of malicious software ("malware") existing across the Internet continues to increase at a significant rate. Malware, in the form of, for example, viruses, spyware, and worms, is essentially software code written to infiltrate and/or damage a computer system. In some worst case scenarios, malware can destroy important data, render a computer system virtually useless, and/or bring down a network of hundreds or thousands of computer systems. Recovering a computer system or network from a successful malware attack often requires considerable resources. Further, malware, while typically attacking computer systems connected to the Internet, can also spread from one computer system to the other by, for example, a non-Internet based file transfer between computer systems.

In an effort to protect computer systems against malware, various companies design and offer anti-malware programs (e.g., Norton Antivirus™ by Symantec Corporation). Generally, anti-malware programs use "signatures" and "heuristics" to detect malware. A signature of a particular type of malware is a characteristic (e.g., a bit pattern) unique to a type of malware. Anti-malware programs rely on signatures to detect and identify specific malware. Stored signatures must be kept up-to-date in order for anti-malware programs to remain effective as malware evolves over time.

The reliance of anti-malware programs on heuristics involves detecting behaviors that indicate the presence of malware. Such behavior may be detected by monitoring running software for suspicious actions that indicate malicious activity. Suspicious actions include, for example, particular software installing itself in an obscure or hidden location, copying itself to another computer, downloading and installing additional software without knowledge of the user, modifying registry settings, and modifying executable files.

Typically, anti-malware programs work in one or both of two modes. In one mode, a user may initiate a "scan mode," in which the anti-malware program examines the user's computer system for matching malware signatures. In another mode, real-time monitoring may occur, whereby the anti-malware program continuously runs during use of the computer system. When malware is detected in either of these modes, (i) the user can be alerted of the found malware and asked what action to take, or (ii) the found malware can be automatically quarantined and/or removed.

The operation of an anti-malware program generally involves scanning all the files and/or memory of a computer system. Those skilled in the art will note that scanning is computationally expensive. Further, the scanning of certain types of files may not be well received by a program having a domain of which the files are part. The "domain" of a software program is defined as the set of files and/or memory of a computer system that the program has designated or otherwise uses for its operation.

Further, an anti-malware program may be designed to allow a user to select certain files to exclude from scanning by the anti-malware program. However, those skilled in the art will note that the domain of certain software programs may dynamically change during the course of operation. Further, those skilled in the art will note that manually excluding files from a domain of an anti-malware program is susceptible to a relatively high level of error and requires a high level of sophistication at the user level.

SUMMARY

According to at least one aspect of one or more embodiments of the present invention, a method of protecting a computer system against malware with an anti-malware program comprises: automatically detecting an existence of a program at least one of installed and running on the computer system; determining a domain of the program; excluding the domain of the program from a domain of the anti-malware program; and scanning for malware the domain of the anti-malware program.

According to at least one other aspect of one or more embodiments of the present invention, a system for protecting a computer system against malware comprises: a software detection module arranged to automatically detect for a predetermined type of software program; a software domain detection module arranged to determine a domain of the software program; a domain exclusion module arranged to exclude the domain of the software program from a domain of an anti-malware program; and a malware scanning module arranged to scan the domain of the anti-malware program.

According to at least one other aspect of one or more embodiments of the present invention, a computer-readable medium has instructions stored therein to: automatically detect a predetermined type of program at least one of installed and running on a computer system; determine a configuration of the program; exclude a domain of the program from a domain of an anti-malware program based on the determination; and scan for malware the domain of the anti-malware program.

The features and advantages described herein are not all inclusive, and, in particular, many additional features and advantages will be apparent to those skilled in the art in view of the following description. Moreover, it should be noted that the language used herein has been principally selected for readability and instructional purposes and may not have been selected to circumscribe the present invention.

Each of the figures referenced above depict an embodiment of the present invention for purposes of illustration only. Those skilled in the art will readily recognize from the following description that one or more other embodiments of the structures, methods, and systems illustrated herein may be used without departing from the principles of the present invention.

DETAILED DESCRIPTION

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description.

In general, embodiments of the present invention relate to a technique for automating a configuration of an anti-malware program to prevent scanning of certain files in a computer system. Such automatic configuration of the anti-malware program is dependent on a configuration of another software program installed or running on the computer system.

As described above, a "domain" of a software program is the set of files and/or memory of a computer system that the program has designated or otherwise uses for its operation. For example, in the case of a typical anti-malware program, its domain may be the entire hard drive (or other storage device) of the computer system on which the program is installed. In another example, the domain of an anti-malware program may include only part of a hard drive (e.g., a particular partition or sectors of the hard drive). Further, as referred to herein, "security domains" are domains held by general or special-purpose anti-malware programs.

Figure 1:
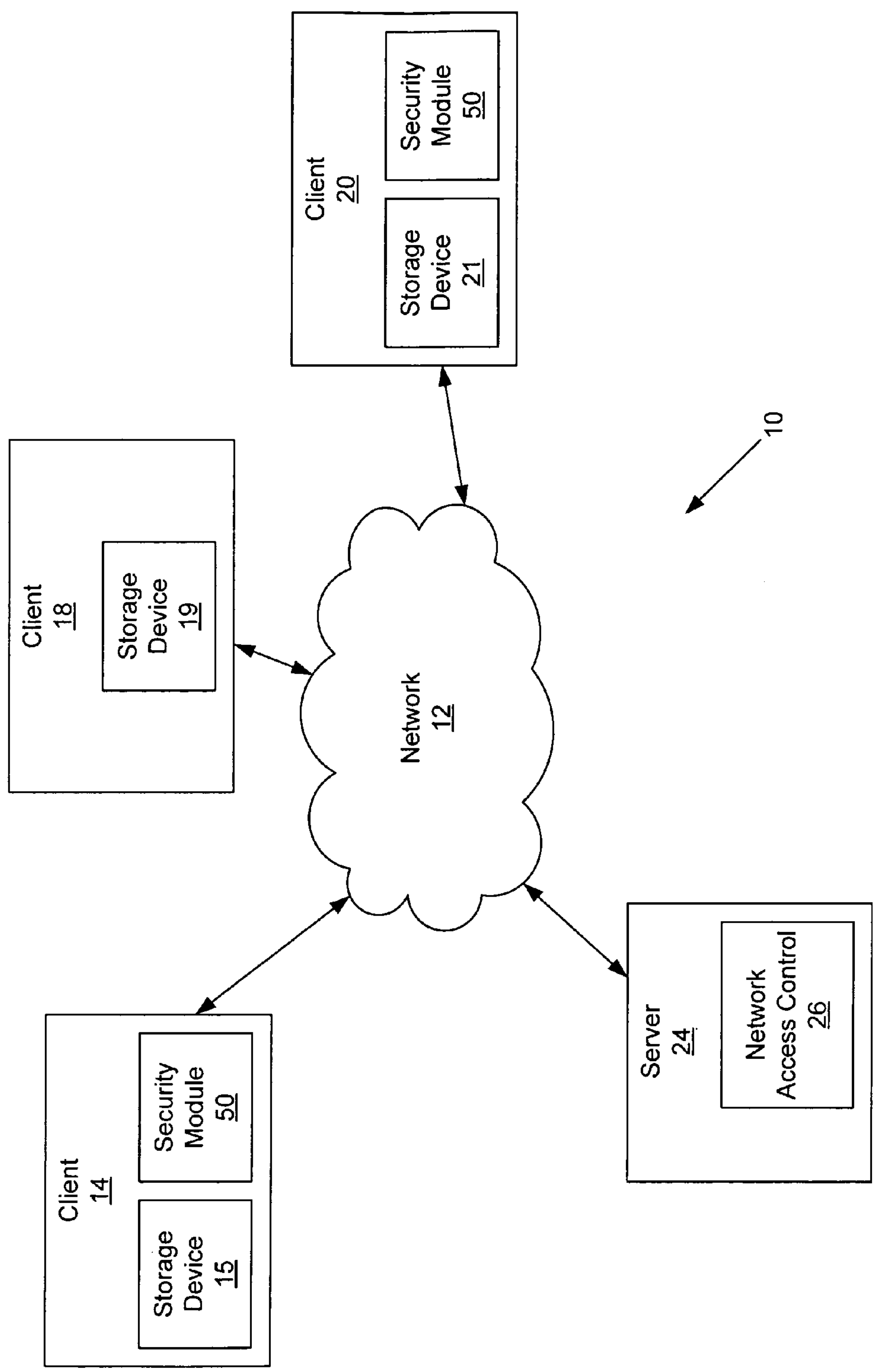
FIG. 1 shows a computing environment in accordance with an embodiment of the present invention.

FIG. 1 shows a computing environment 10 in accordance with an embodiment of the present invention. The computing environment 10 includes a "server" system 24 and a plurality of "client" systems 14, 18, 20 connected over a network 12. The network 12 may be a local area network (LAN) (e.g., an enterprise network) or a wide area network (WAN) (e.g., the Internet). Further, the network 12 may be formed of links using technologies such as Ethernet, 802.11 (wireless interface), an integrated services digital network (ISDN), a digital subscriber line (DSL), and/or an asynchronous transfer mode (ATM). Further, networking protocols used on the network 12 may include multiprotocol label switching (MPLS), a transmission control protocol/Internet protocol (TCP/IP), a User Datagram Protocol (UDP), a hypertext transport protocol (HTTP), a simple mail transfer protocol (SMTP), and/or a file transfer protocol (FTP). Data exchanged over the network 12 may be represented using technologies and/or formats such as a hypertext markup language (HTML), an extensible markup language (XML), and/or a simple object access protocol (SOAP). Moreover, some or all of the links across the network 12 may be encrypted using encryption technologies such as a secure sockets layer (SSL), a secure hypertext transport protocol (HTTPS), and/or a virtual private network (VPN). In one or more embodiments, communication over the network 12 may be based on custom and/or dedicated means instead of, or in combination with, the technologies described above.

In general, the server 24 services, over the network 12, requests from the clients 14, 18, 20. The clients 14, 18, 20 represent the plurality of clients that might be connected to the network 12. In one or more embodiments, one or more of the clients 14, 18, 20 may be personal computers (e.g., laptops, desktops) having an operating system platform using Windows® by Microsoft Corporation, MacOS by Apple Computer, Inc., Linux, and/or UNIX. Further, in one or more embodiments, one or more of the clients 14, 18, 20 may be other network-enabled electronic devices such as cellular telephones, personal digital assistants (PDAs), or portable e-mail devices.

The server 24 has a network access control module 26 that is designed to control access to the network 12 by the clients 14, 18, 20. For example, when client 14 is introduced to the network 12, the network access control module 26 may verify the client 14 to ensure that the client 14 meets certain identification and/or system requirements. A further description of the network access control module 26 is provided below with reference to FIG. 2.

Still referring to FIG. 1, clients 14, 20 have security modules 50. The security modules 50 rely on anti-malware programs to protect storage devices (e.g., memory, hard drive, universal serial bus (USB) drive) 15, 21 of its respective client 14, 20 against malware. Thus, the domain of the security module 50 at client 14 includes at least a portion of the storage device 15, and the domain of security module 50 at client 20 includes at least a portion of the storage device 21.

Client 18 is shown as not having a security module. When client 18 is introduced to the network 12, the network access control module 26 may recognize that client 18 is "unprotected" and accordingly designate client 18 for a security update. The security update may involve one of the security modules 50 at client 14, 20 extending its domain over client 18, thereby causing the associated anti-malware program to be responsible for scanning the storage device 19 of client 18. Further, in one or more embodiments, the security modules 50 and server 24 may be in periodic or constant communication regarding the mapping of security domains across the network 12.

Figure 2:
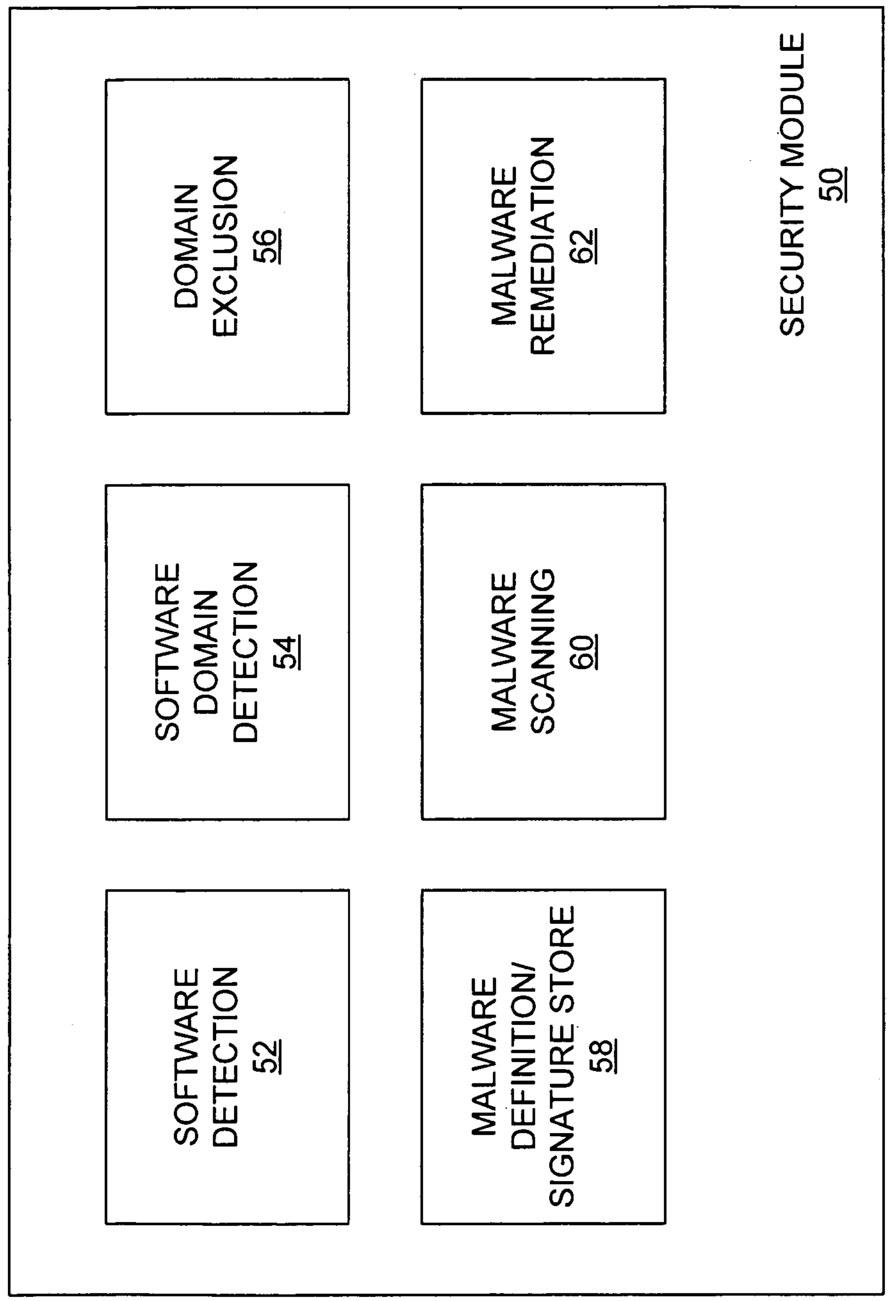
FIG. 2 shows a block diagram of a security module in accordance with an embodiment of the present invention.

FIG. 2 shows a representative security module 50 in accordance with an embodiment of the present invention. Those skilled in the art will note that a "module" refers to any program logic or functionality implemented in software and/or hardware.

At start-up and/or during operation of a computer system having the security module 50, a software detection sub-module 52 is arranged to detect for the existence of other software programs installed or running on a client. In one or more embodiments, the presence of a particular program may be detected by searching for particular files of a type specific to the particular program. Further, in or more embodiments, the presence of a particular program may be detected by recognizing a file directory structure that is known to be associated with the particular program. Further, in one or more embodiments, the presence of a particular program may be detected by examining running processes and recognizing one or more of those processes as belonging to the particular program. Further, in one or more embodiments, the presence of a particular program may be detected by examining registry settings and identifying particular registry settings as belonging to the particular program. Further, in one or more embodiments, the presence of a particular program may be detected by examining install or uninstall files/settings and recognizing those files/settings as being associated with the particular program.

Further, the software detection sub-module 52 may detect for one or more of various types of particular programs. For example, the software detection sub-module 52 may detect the presence of an e-mail program (e.g., Exchange Server by Microsoft Corporation) running on the client. In another example, the software detection sub-module 52 may detect the presence of a program that is known to have its own security protection. In still another example, the software detection sub-module 52 may detect the presence of a program that is using or operating on files that could cause the program to fail or slow down should scanning of those files occur. In still another example, the software detection sub-module 52 may detect the presence of a program that is using or operating on files having data arranged in a manner that is not recognizable by an anti-malware program. In still another example, the software detection sub-module 52 may detect the presence of special-purpose security software arranged to secure particular programs, files, and/or memory.

Further, the software detection sub-module 52 may be arranged to automatically detect for the existence of one or more installed/running software programs. In other words, the software detection sub-module 52 does not only detect for software at start-up, reboot, or upon user command. Instead, the software detection sub-module 52 detects for the existence of software of, for example, the types described above, throughout the operation and use of a computer system. Such automated detection may involve periodically detecting for software. For example, the software detection sub-module 52 may automatically run every 30 minutes.

Further, in one or more embodiments, automated detection may involve detecting for software after a certain event has occurred. For example, if software is downloaded or installed, the software detection sub-module 52 may be caused to run. In another example, if a registry setting change occurs, the software detection sub-module 52 may be caused to run.

Further, in one or more embodiments, automated detection may involve detection for software at user-defined intervals. For example, the user may configure the computer system to cause the software detection sub-module 52 to run every 90 minutes.

Still referring to the security module 50 shown in FIG. 2, a software domain detection sub-module 54 is arranged to determine a domain of a particular software program detected by the software detection sub-module 52. In general, the software domain detection sub-module 54 examines the configuration of a particular program detected by the software detection sub-module 52 to ascertain the domain of that program. One way to determine the domain of a program is to examine the file directory structure of the program and then defining a domain of that program as including all the files within the directory.

Further, in one or more embodiments, the software domain detection sub-module 54 may examine the registry settings of a particular program to determine where that program stores its data and executable files and then define a domain of that program as including the "pointed to" locations. As such, the configuration of a software program may be determined through a series of registry reads and directory queries (e.g., lightweight directory access protocol (LDAP), Active Directory® by Microsoft Corporation, Novell Directory Service (NDS) by Novell, Inc.).

Further, in one or more embodiments, the configuration of a software program may be determined by reading and parsing a program's configuration file to determine the program's domain. The configuration file typically includes information regarding where the program is to store files, what file extensions the program uses, and/or the arrangement of data within its files. Accordingly, such program-specific information may be used to determine the program's domain.

Further, in one or more embodiments, the configuration of a software program may be determined by inspecting open file handles of running processes. For example, if certain files are open (e.g., being modified by a user), the system is shown as having an open running process of an affiliated type or name. Because this information generally identifies the running program to which the open file belongs, the inspected open file handle may be used to determine at least part of the domain of the software program.

Further, in one or more embodiments, the configuration of a software program may be determined by querying an application program interface (API) of the software program. For example, the program itself may specify, via its API, its configuration/domain to the security module 50 or component thereof. Alternatively, the security module 50 itself may query the program's API for the configuration/domain information.

Still referring to the security module 50 shown in FIG. 2, a domain exclusion sub-module 56 is arranged to restrict the domain of an anti-malware program. The domain exclusion sub-module 56 effectively receives outputs from one or both of the software detection sub-module 52 and the software domain detection sub-module 54 and then selectively excludes the domains of some software from the domain of the security software. For example, with reference to FIG. 1, initially, the security module 50 at client 14 has a domain covering the entire hard drive of client 14; however, this security domain is later restricted based on the determined domains of other programs. Thus, in other words, the overlap in domains of detected software programs (as determined by sub-modules 52, 54) and the anti-malware program is excluded from the domain of the anti-malware program. Such exclusion results in the anti-malware program not being responsible for the scanning of the domains of the detected software program. For example, once a domain of an e-mail program is determined by the software domain detection sub-module 54, the domain exclusion sub-module 56 may exclude that domain from the domain of the anti-malware program because the e-mail program is known to (i) have its own security software or (ii) be adversely affected by the scanning of its files by a general anti-malware program.

Further, in one or more embodiments, the discovery of one program by the software detection sub-module 52 may result in the exclusion of the domain of another program by the domain exclusion sub-module 56. For example, if the software detection sub-module 52 detects the presence of a particular type of e-mail program, the domain exclusion sub-module 56 may exclude the domain of an e-mail server associated with the e-mail program, so as to prevent scanning of the domain of the e-mail server.

The security module 50 shown in FIG. 2 also includes or is otherwise associated with a malware definition/signature store 58, a malware scanning sub-module 60, and a malware remediation sub-module 62. The malware definition/signature store 58 is arranged to keep an up-to-date database of the characteristics of known malware. The malware definition/signature store 58 may be updated automatically at fixed intervals, upon detection of newly available malware definitions or signatures, or upon user command.

Based on the information contained in the malware definition/signature store 58, the malware scanning sub-module 60 scans its domain for malware. The malware scanning sub-module 60 scans its domain based on one or more of signature scanning and heuristics analysis. Those skilled in the art will recall that the domain of the anti-malware program may be that resulting after exclusion of one or more domains from its domain. Further, those skilled in the art will note that the malware scanning sub-module 60 may be used to perform one or more of various types of scanning. For example, the malware scanning sub-module 60 may scan files, files systems, memory (e.g., random access memory (RAM)), network resources (e.g., firewall ports), a universal serial bus (USB) drive/adapter, an external hard drive, and/or drive partitions.

The scanning by the malware scanning sub-module 60 may result in the detection of malware running/residing on the computer system. The detected malware is then handled by the malware remediation sub-module 62. The malware remediation sub-module 62 may handle the detected malware in one or more various ways. For example, the malware remediation sub-module 62 may simply quarantine the detected malware so as to isolate the detected malware from running processes. Moreover, the malware remediation sub-module 62 may clean the detected malware by altogether deleting the detected malware from the computer system. Still further, the malware remediation sub-module 62 may be caused to ignore the detected malware upon user command.

Further, in one or more embodiments, a computer system may be scanned remotely. For example, a computer system having the security module 50 shown in FIG. 2 may be mapped to a remote drive accessible over a network (e.g., 12 in FIG. 1). If the security module 50 determines, via software detection sub-module 52, that the remote drive is not secured by a software program, then the security domain of the malware scanning sub-module 60 is configured to include the remote drive so as to ensure that the remote drive is scanned by the malware scanning sub-module 60. However, if the remote drive is protected by a software program, the security domain of the malware scanning sub-module 60 is configured to not include the remote drive, thereby preventing scanning of the remote drive by the malware scanning sub-module 60.

The remote detection of software by software detection sub-module 52 may occur through use of, for example, the network access control 26 shown in FIG. 1. Now also referring to FIG. 1, the configuration of a computer system connected to the network 12 may be broadcast over the network 12 to a computer system having the security module 50, so as to enable the software detection sub-module 52 to determine the configuration and domain of the remote computer system. Further, in one or more embodiments, the configuration of a remote computer system may be described through a network interface accessible to the computer system having the security module 50.

Figure 3:
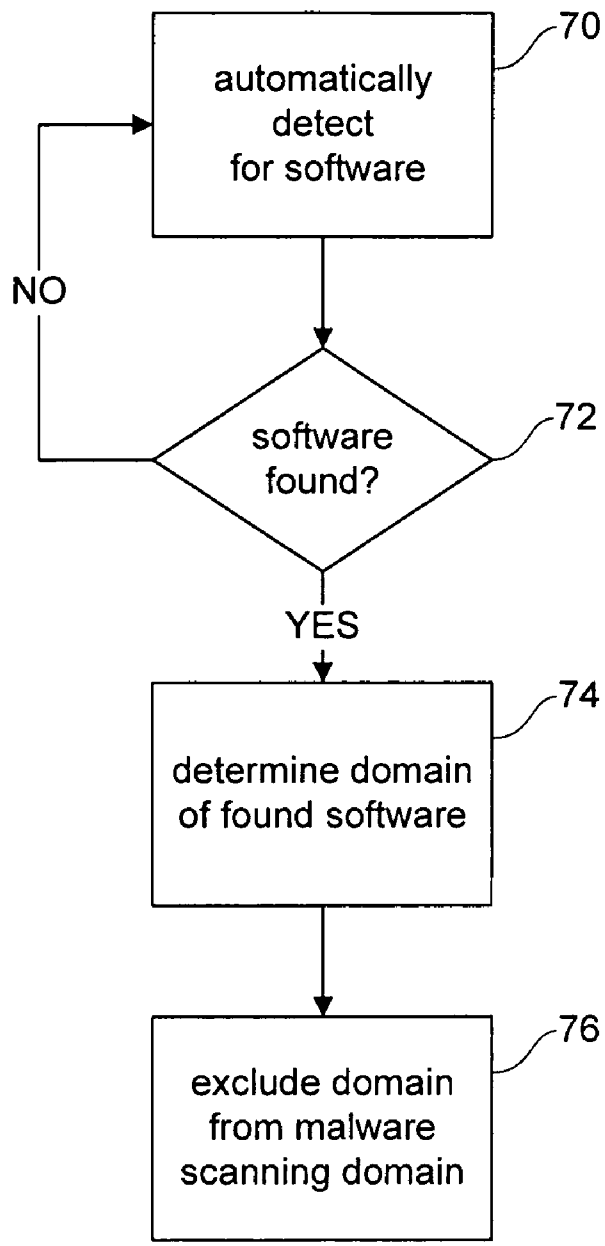
FIG. 3 shows a flow process of steps performable by a security module in accordance with an embodiment of the present invention.

FIG. 3 shows a flow process in accordance with an embodiment of the present invention. At step 70, a computer system automatically detects for one or more types of software programs. Such automatic detection may occur at boot time, periodically, at user-defined intervals, or in response to particular events. Those skilled in the art will note that such automatic detection allows for the detection of software even though the domain(s) of the software may dynamically change over time. If a particular type of software program is found 72, the computer system determines a domain of the detected software program 74. That determined domain is then excluded from a domain of an anti-malware program 76 so as to, for example, prevent the anti-malware program from scanning the domain of the detected software program, which may be protected by its own security software.

Figure 4:
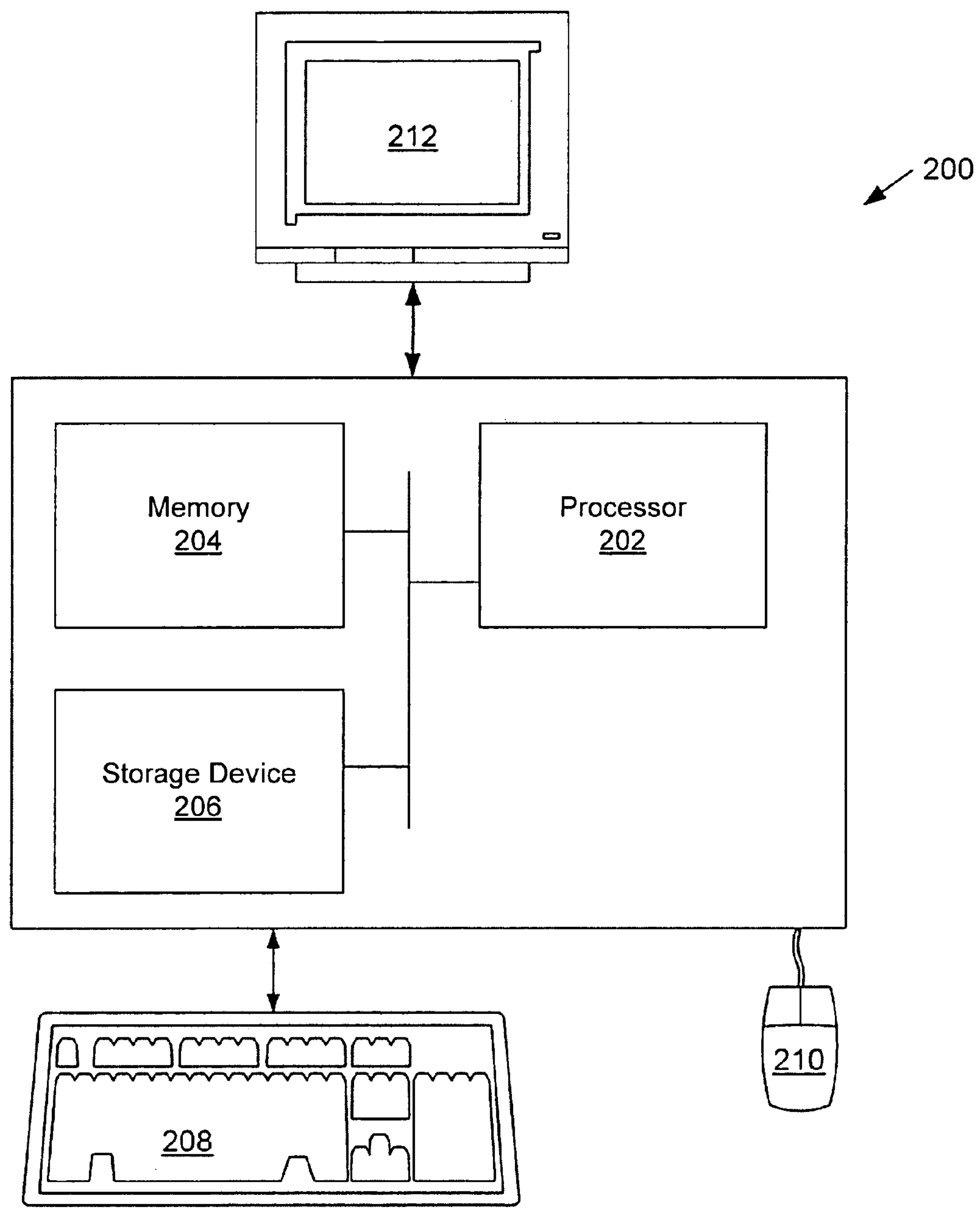
FIG. 4 shows a computer system in accordance with an embodiment of the present invention.

Further, one or more embodiments of the present invention may be associated with virtually any type of computer system, including multiprocessor and multithreaded uniprocessor systems, regardless of the platform being used. For example, as shown in FIG. 4, a networked computer system 200 includes at least one processor (e.g., a general-purpose processor, a field-programmable gate array (FPGA), an application-specific integrated circuit (ASIC), a graphics processor) 202, associated memory 204, a storage device 206, and numerous other elements (not shown) and functionalities typical of modern computer systems. The networked computer system 200 may also include input means (e.g., a keyboard 208, a mouse 210) and output means (e.g., a monitor 212). The networked computer system 200 may be connected to a LAN or a WAN via a network interface connection (not shown). Those skilled in the art will appreciate that these input and output means may take other forms. Further, those skilled in the art will appreciate that one or more elements of the networked computer system 200 may be remotely located and connected to the other elements over a network. Further, software instructions to perform one or more embodiments of the present invention may be stored on a computer-readable medium such as a compact disc (CD), a diskette, a tape, a file, a hard drive, or any other computer-readable storage device.

Advantages of the present invention may include one or more of the following. In one or more embodiments, a computer system may automatically configure an anti-malware program to prevent that anti-malware program from scanning a domain of another software program, which if scanned by the anti-malware program, might result in conflict, error, and/or a reduction in system performance.

Further, in one or more embodiments, a domain of an anti-malware program may be automatically configured during operation of a computer system so as to "keep up" with dynamic changes to the domains of one or more other software programs installed/running on the computer system.

Further, in one or more embodiments, a domain of an anti-malware program may be automatically configured so as to reduce or eliminate direction needed from a user.

Further, in one or more embodiments, a domain of an anti-malware program may be automatically reduced so as to lessen the amount of scanning, thereby reducing computational effort.

While the invention has been described with respect to a limited number of embodiments, those skilled in the art, having benefit of the above description, will appreciate that other embodiments may be devised which do not depart from the scope of the present invention as described herein. Accordingly, the scope of the present invention should be limited only by the appended claims.

What is claimed is:

1. A method of protecting a computer system against malware with an anti-malware program, the method comprising:

automatically detecting an existence of a program present on the computer system;

determining a domain of the program by analyzing a configuration of the program, the domain comprising a set of files and/or memory that the program uses for its operation;

excluding the determined domain of the program from a security domain of the anti-malware program, the security domain for the anti-malware program describing areas of the computer system scanned by the anti-malware program for malware; and scanning for malware in the security domain of the anti-malware program.

2. The method of claim 1, wherein the computer system is remote from a second computer system on which the anti-malware program is installed.

3. The method of claim 1, wherein the program is of a predetermined type, the predetermined type being at least one of security software and software that is known to be protected by software other than the anti-malware program, and wherein the domain of the program is excluded from the security domain responsive to the program being of the predetermined type.

4. The method of claim 1, the automatically detecting comprising at least one of:

periodically detecting for the existence of the program;

detecting for the existence of the program in response to an occurrence of a predetermined event; and detecting for the existence of the program at user-defined intervals.

5. The method of claim 1, the determining comprising:

examining a file structure of a storage device associated with the computer system.

6. The method of claim 5, the examining comprising at least one of:

performing a registry read;

querying a file directory structure;

reading a configuration file;

analyzing at least one open file handle of a running process of the program; and querying an application program interface of the program.

7. The method of claim 1, the excluding the domain comprising:

determining an overlap portion between the domain of the program and the security domain of the anti-malware program; and excluding the overlap portion from the security domain.

8. The method of claim 1, wherein the security domain of the anti-malware program initially covers the domain of the program and wherein the excluding restricts the domain of the program from the security domain.

9. A system for protecting a computer system against malware, comprising:

a non-transitory computer-readable storage medium having executable instructions stored therein, the instructions comprising:

a software detection module arranged to automatically detect for a predetermined type of software program present on the computer system;

a software domain detection module arranged to determine a domain of the software program by analyzing a configuration of the program, the domain comprising a set of files and/or memory that the program uses for its operation;

a domain exclusion module arranged to exclude the determined domain of the software program from a security domain of an anti-malware program, the security domain for the anti-malware program describing areas of the computer system scanned by the anti-malware program for malware; and a malware scanning module arranged to scan the security domain of the anti-malware program for malware; and a processor for executing the instructions.

10. The system of claim 9, wherein the software program resides on a computer system remote from a computer system on which the anti-malware program resides.

11. The system of claim 9, the software detection module further arranged to at least one of:

periodically detect for the software program;

detect for the software program in response to an occurrence of a predetermined event; and detect for the software program at user-defined intervals.

12. The system of claim 9, the software domain detection module further arranged to examine a file structure of a storage device associated with the computer system.

13. The system of claim 9, the software domain detection module further arranged to at least one of:

perform registry reads and directory queries;

read a configuration file;

analyze at least one open file handle of a running process of the software program; and query an application program interface of the software program.

14. The system of claim 9, the computer-readable storage medium further comprising:

a malware definition/signature store arranged to store characteristics of known malware, wherein the malware scanning module uses characteristics stored in the malware definition/signature store; and a malware remediation module arranged to remediate malware detected by the malware scanning module.

15. The system of claim 9, wherein the software domain detection module is dependent on a network access control module, the network access control module arranged to store a configuration of a computer system on which the software program is installed.

16. The system of claim 9, the domain exclusion module further arranged to determine an overlap portion between the domain of the software program and the security domain of an anti-malware program and exclude the overlap portion from the security domain.

17. The system of claim 9, wherein the software program is at least one of security software and software known to be protected by software other than the anti-malware program.

18. A non-transitory computer-readable storage medium having executable instructions stored therein, the instructions comprising instructions to:

automatically detect a predetermined type of program present on a computer system;

determine a domain of the program by analyzing a configuration of the program, the domain comprising a set of files and/or memory that the program uses for its operation;

exclude the determined domain of the program from a security domain of an anti-malware program, the security domain for the anti-malware program describing areas of the computer system scanned by the anti-malware program for malware; and scan for malware in the security domain of the anti-malware program.

19. The computer-readable medium of claim 18, wherein the computer system is remote to a second computer system on which the anti-malware program is installed.

20. The computer-readable medium of claim 18, further comprising instructions to at least one of:

periodically detect for the program;

detect for the program in response to an occurrence of a predetermined event; and detect for the program at user-defined intervals.

21. The computer-readable medium of claim 18, further comprising instructions to:

determine an overlap portion between the domain of the program and the security domain of the anti-malware program; and exclude the overlap portion from the security domain.

22. The computer-readable medium of claim 18, wherein the program is at least one of security software and software known to be protected by software other than the anti-malware program.

* * * * *